(12) United States Patent
Hamamura

(10) Patent No.: US 9,247,231 B2
(45) Date of Patent: Jan. 26, 2016

(54) 3D IMAGE SIGNAL PROCESSING APPARATUS

(75) Inventor: Shigeo Hamamura, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 222 days.

(21) Appl. No.: 14/129,482

(22) PCT Filed: Aug. 29, 2011

(86) PCT No.: PCT/JP2011/069425
§ 371 (c)(1),
(2), (4) Date: Dec. 26, 2013

(87) PCT Pub. No.: WO2013/030914
PCT Pub. Date: Mar. 7, 2013

(65) Prior Publication Data
US 2014/0146138 A1 May 29, 2014

(51) Int. Cl.
*H04N 13/00* (2006.01)
*H04N 13/04* (2006.01)

(52) U.S. Cl.
CPC ......... *H04N 13/004* (2013.01); *H04N 13/0048* (2013.01); *H04N 13/0059* (2013.01); *H04N 13/0497* (2013.01)

(58) Field of Classification Search
CPC .................... H04N 13/004; H04N 13/0048
USPC ........................................................... 348/43
See application file for complete search history.

(56) References Cited

U.S. PATENT DOCUMENTS

2010/0182402 A1* 7/2010 Nakajima .............. G09G 5/006
348/42
2010/0238349 A1 9/2010 Kimura

FOREIGN PATENT DOCUMENTS

| CN | 101542586 A | 9/2009 |
|----|-------------|--------|
| JP | 2008-0197141 | 8/2008 |
| JP | 2010-028261 | 2/2010 |
| JP | 2010-034704 | 2/2010 |
| WO | WO 2011/039852 | 4/2011 |

OTHER PUBLICATIONS

Chinese Office Action dated Mar. 30, 2015 with an English translation thereof.
International Search Report (ISR) (PCT Form PCT/ISA/210), in PCT/JP2011/069425, dated Nov. 15, 2011.

* cited by examiner

*Primary Examiner* — Sath V Perungavoor
*Assistant Examiner* — Jeffery Williams
(74) *Attorney, Agent, or Firm* — McGinn IP Law Group, PLLC (57) ABSTRACT

In 3D display, when double the frequency of the input clock exceeds the maximum rate of transmission to cinema display circuit 104, the multiply ratio of the clock is lowered from 2× multiplication and the output horizontal total clock number is reduced accordingly.

1 Claim, 6 Drawing Sheets

3D IMAGE SIGNAL PROCESSING APPARATUS

TECHNICAL FIELD

The present invention relates to a 3D (Dimensions) image signal processing apparatus, in particular, to a 3D image signal processing apparatus for combining the left-eye image signal and the right-eye image signal for every frame.

BACKGROUND ART

There have been known movie projectors for displaying a 3D image (which will be referred to hereinbelow as "3D image processing apparatus).

Figure 1:
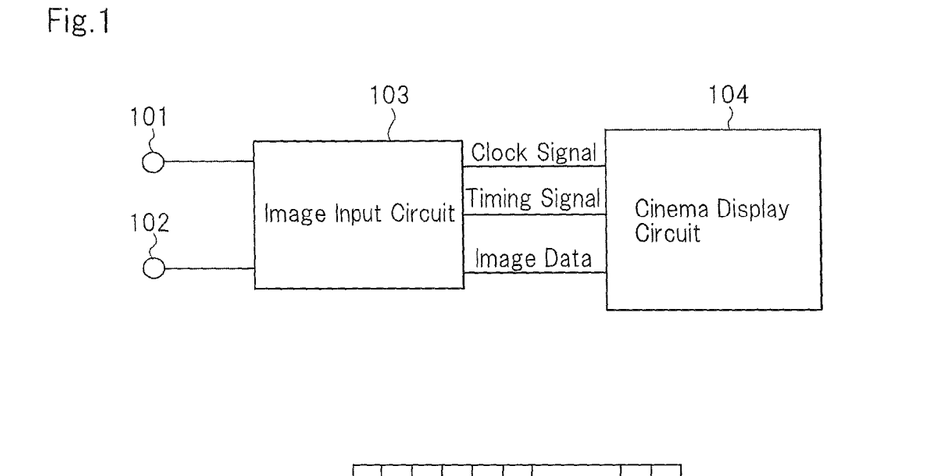
FIG. 1 A block diagram showing a 3D projector.

FIG. 1 is a block diagram showing a 3D projector.

In FIG. 1, the 3D projector includes input terminal 101 for receiving the left-eye image signal, input terminal 102 for receiving the right-eye image signal, image input circuit 103 and cinema display circuit 104.

Image input circuit 103 receives the left-eye image signal from input terminal 101 and receives the right-eye image signal from input terminal 102. Here, the frame period of the left-eye image signal and the frame period of the right-eye image signal are the same.

Figure 2:
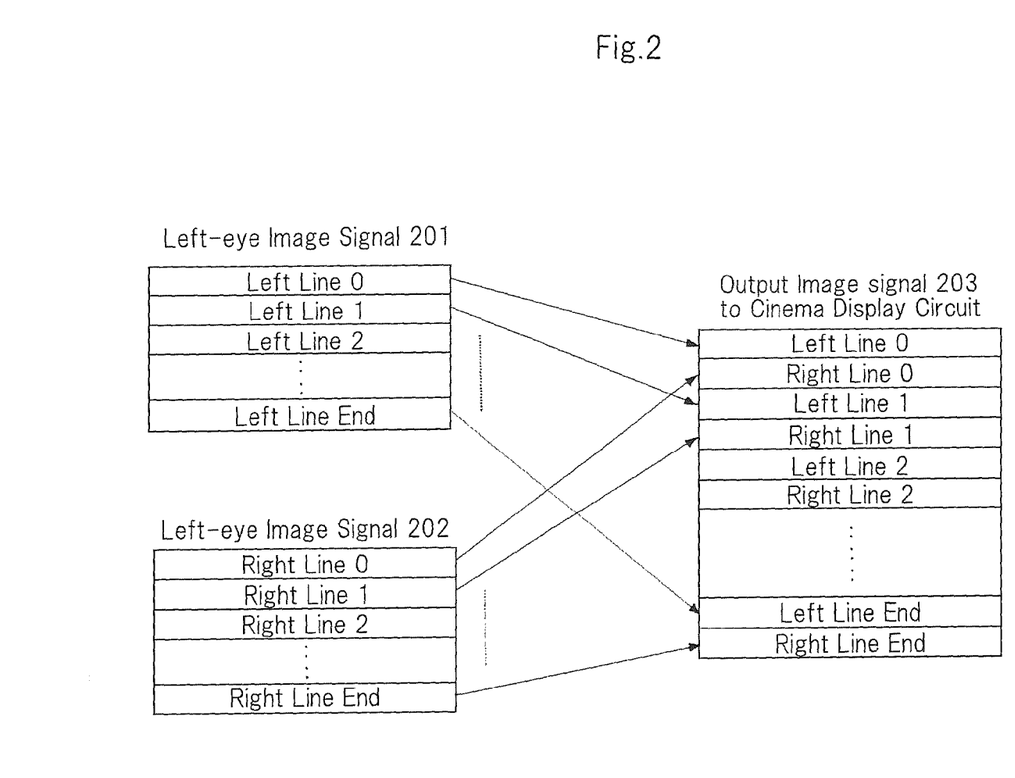
FIG. 2 A diagram for illustrating the operation of image input circuit 103.

FIG. 2 is a diagram for illustrating the operation of image input circuit 103.

Image input circuit 103 combines one frame of left-eye image signal 201 and one frame of right-eye image signal 201, line by line, alternately to produce one frame of output image signal 203 that is to be output to cinema display circuit 104. In this process, image input circuit 103 makes the frame period of output image signal 203 equal to the frame period of left-eye image signal 201 and the frame period of right-eye image signal 202.

Figure 3:
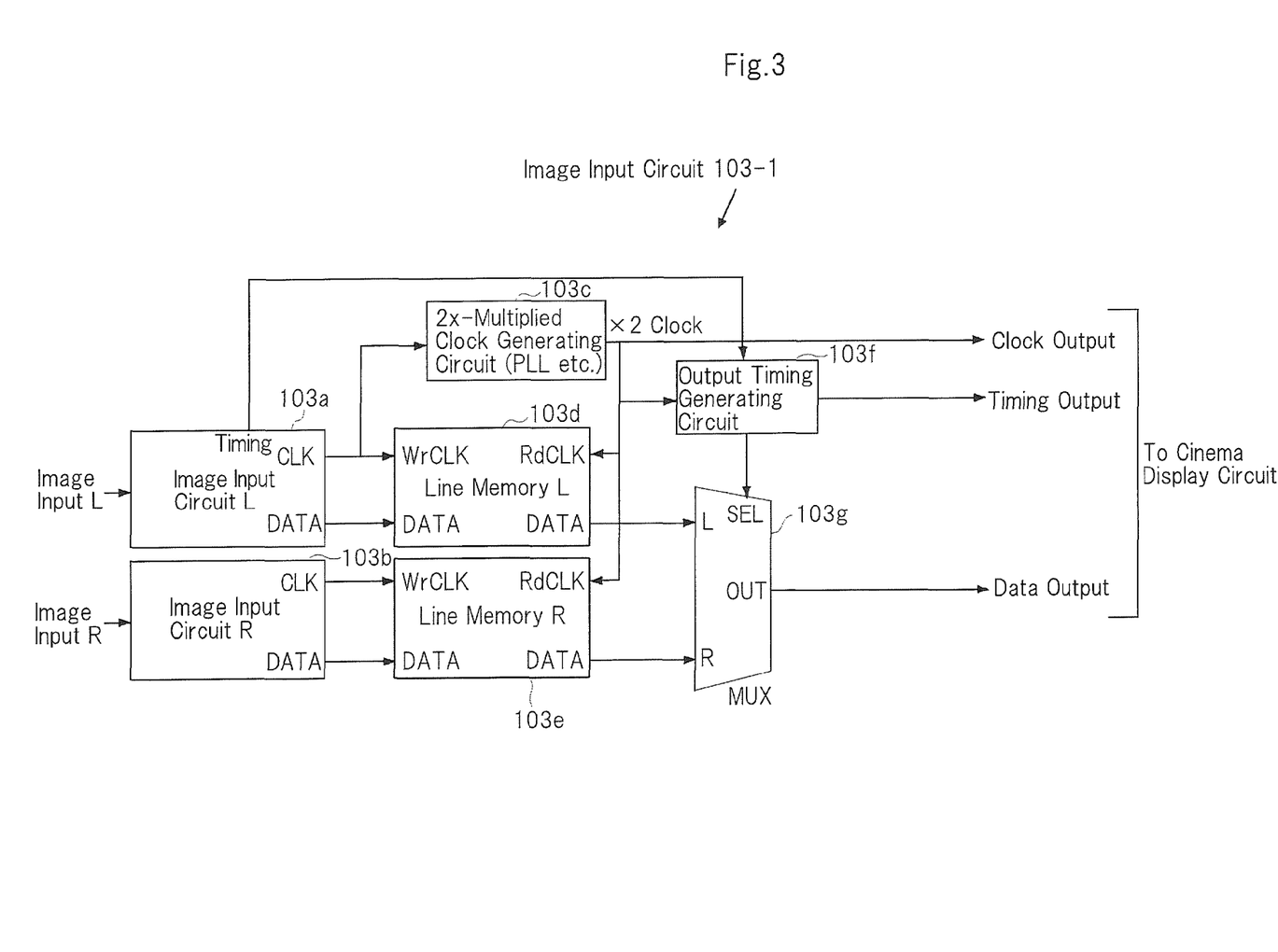
FIG. 3 A diagram showing one example of image input circuit 103.

Image input circuit 103 typically has a configuration shown in FIG. 3, including image input circuit 103a for receiving the left-eye image signal, image input circuit 103b for receiving the right-eye image signal, clock generating circuit 103c such as PLL or the like that multiplies frequency by 2, line memories 103d and 103e, circuit 103f for generating output timing, and multiplexer 103g for switching the left-eye image and the right-eye image, line by line.

The image signals for left eye and right eye are once written in line memories 103d and 103e, respectively, and read out therefrom at double the speed of writing, by circuit 103c for doubling the input clock frequency.

The timing signals for input image signals (the left-eye image and the left-eye image), including horizontal and vertical synchronization signals and signals indicating valid image data, are input to output timing generating circuit 103f.

Output timing generating circuit 103f generates timing signals that, based on the input timing signals, form one frame with as many lines as twice the number of the input vertical lines while keeping the total number of clocks for horizontal fixed at that of the input, and switches one line of the left-eye image and one line of the right-eye image alternately to be output.

In this way, the output frame frequency is set to be the same as the frame frequency of the input and the output line frequency set at double the input line frequency, thereby enabling output of a 3D image.

This scheme, however, requires the frequency of the input signal to cinema display circuit 104 to be set so that the doubled frequency falls within the permissible rate of transmission of cinema display circuit 104. That is, the resolution of the image displayable in 3D and the frequency of the vertical synchronization are limited.

Figure 4:
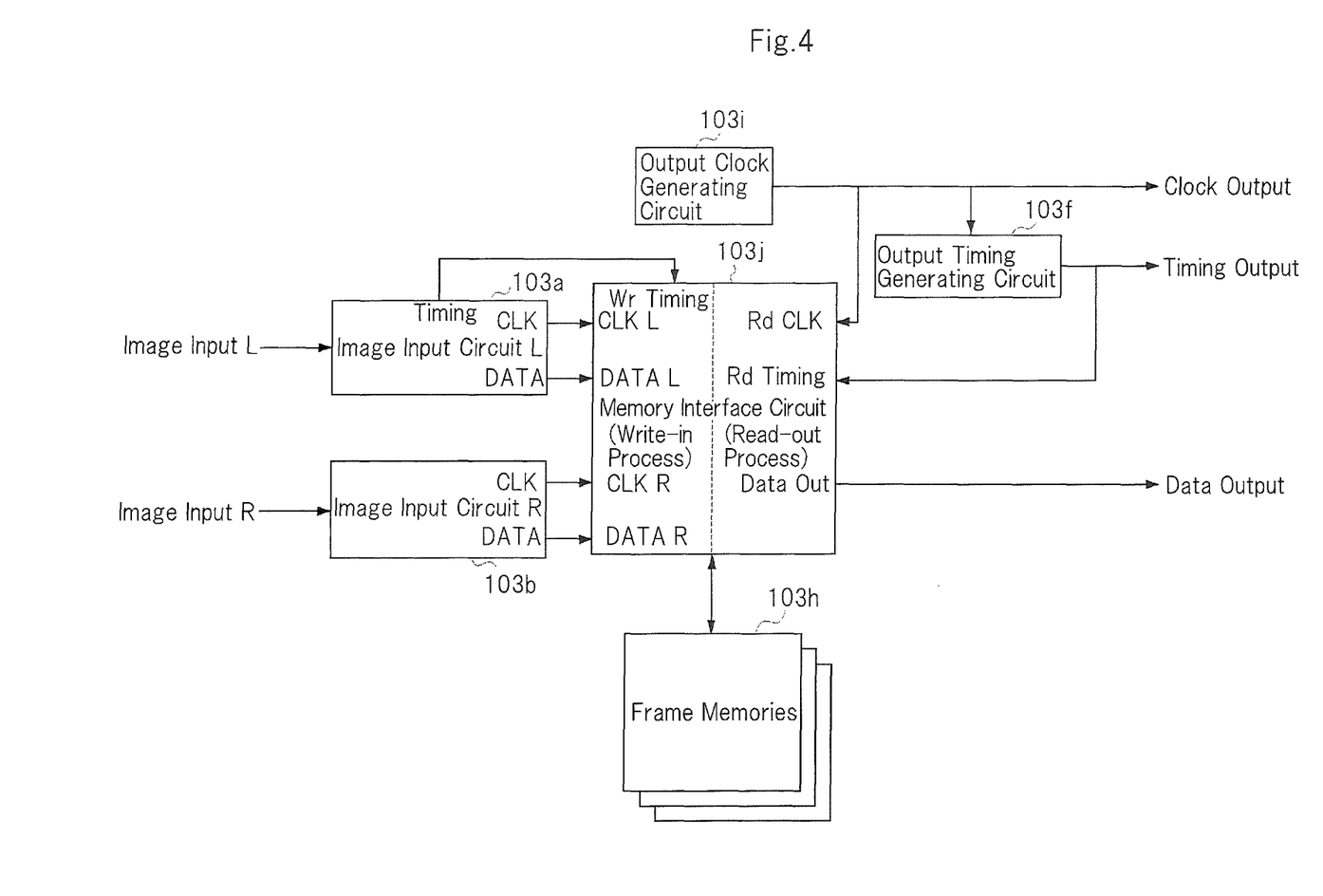
FIG. 4 A diagram showing another example of image input circuit 103.

To deal with, this frame memories 103h are generally used so that the left-eye image and the left-eye image are read out from frame memories 103h by way of memory interface circuit 103j at an arbitrary clock frequency generated by output clock generating circuit 103i without depending on the clock frequency of the input image signal, or at the permissible maximum input frequency of cinema display circuit 104, and output timing generating circuit 103f outputs signals so as to adjust the number of horizontal clocks and the number of vertical lines to be equal to the input vertical frequency.

SUMMARY OF THE INVENTION

Problems to be Solved by the Invention

The method using frame memories can deal with any input signal timing as long as the minimum values of horizontal and vertical blanking in cinema display circuit 104 can be assured, whereas there is a problem in which high-capacity, high-speed memories need to be added as the frame memories in order to deal with image signals of high resolutions.

The object of the present invention is to provide a 3D image signal processing apparatus that can solve the above problem.

Means for Solving the Problems

A 3D image signal processing apparatus according to the present invention is a 3D image signal processing apparatus which;

receives a plurality of image signals for the left eye and the right eye, each image signal including a clock signal and each image signal representing a plurality of lines, outputs one frame of output image signals formed by combining one line of the left-eye image signal and one line of the right-eye image signal, alternately, to a display circuit, and causes the display circuit to display images of every frame, the 3D image signal processing apparatus comprising:

first line storing means for storing every line of the left-eye image;

second line storing means for storing every line of the right-eye image;

measuring means for measuring the frequency of the clock signal in the input left-eye image signal or right-eye image signal; and, control means which, when the frequency of the clock signal measured by the measuring means is higher than a permissible maximum transmission rate for the display circuit, sets the frequency of the clock signal for output image signals, which are to be used for reading out one line of the left-eye image signal and one line of the right-eye image signal from the first line storing means and the second line storing means respectively, to be smaller than double the frequency of the clock signal in the input signal, and reduces the number of clock signals for output image signals that are included in the horizontal period in the output image signal, to less than the number of clock signals that are included in the horizontal period of the input signal.

Effect of the Invention

According to the present invention, it is possible to deal with 3D image input signal exceeding the maximum transmission rate for the display circuit without adding any frame memory.

MODE FOR CARRYING OUT THE INVENTION

One exemplary embodiment according to the present invention will be described in detail with reference to the drawings.

Figure 5:
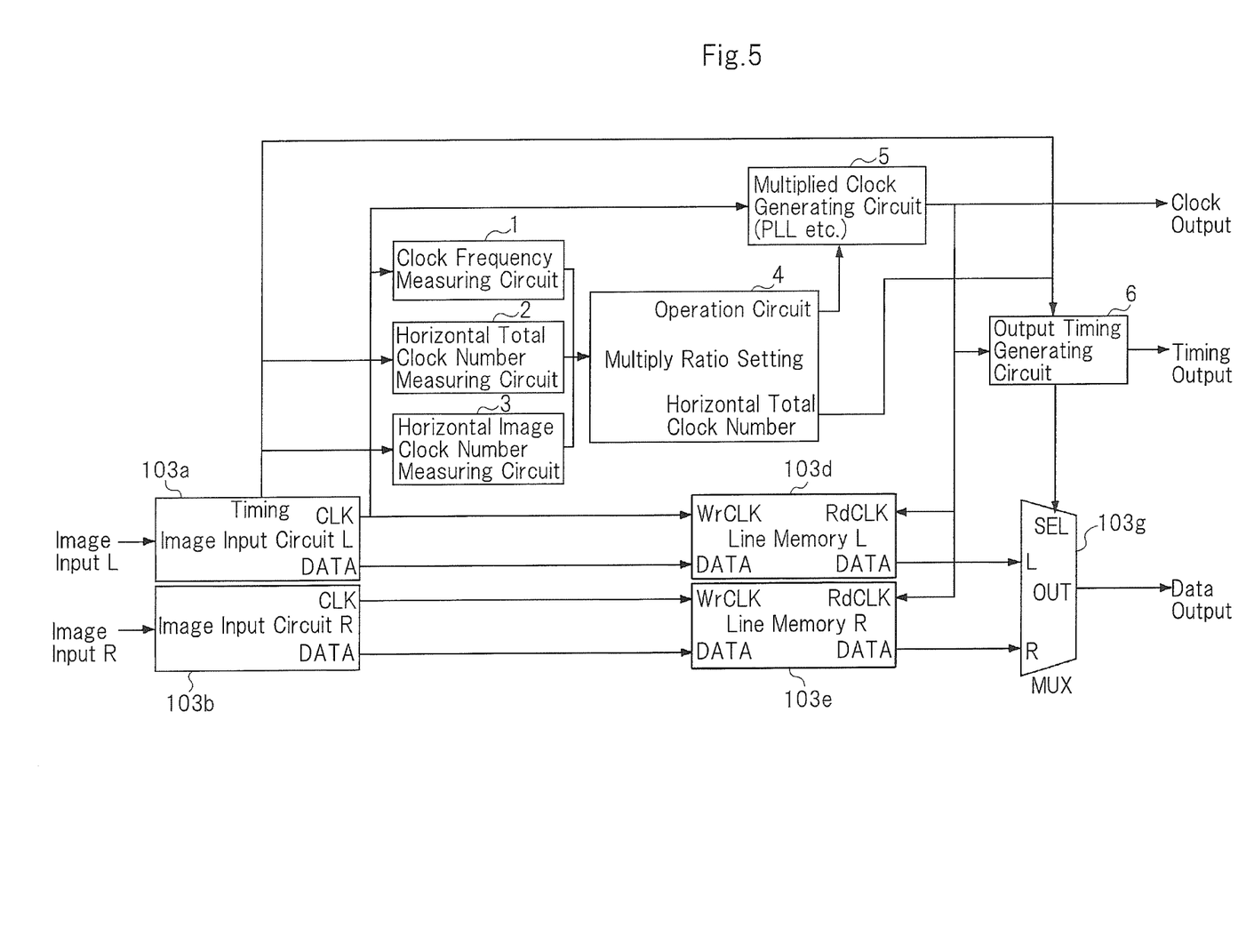
FIG. 5 A block diagram showing image input circuit 103-1 as an example of a 3D image signal processing apparatus of one exemplary embodiment of the present invention.

FIG. 5 is a block diagram showing image input circuit 103-1 as an example of a 3D image signal processing apparatus of one exemplary embodiment of the present invention. Herein, image input circuit 103-1 is used as image input circuit 103 shown in FIG. 2. In FIG. 5, the same components as those in FIG. 3 are allotted the same reference numerals.

Image input circuit 103-1 includes input image signal clock frequency measuring circuit (first measuring means) 1, horizontal total clock number measuring circuit (second measuring means) 2, horizontal image clock number measuring circuit (third measuring means) 3, operation circuit (determining means) 4, multiplied clock generating circuit (first generating means) 5 such as PLL or the like, and output timing generating circuit (second generating circuit) 6, in addition to the configuration shown in FIG. 3. Here, horizontal total clock number measuring circuit 2, horizontal image clock number measuring circuit 3, operation circuit 4, multiplied clock generating circuit 5 such as PLL or the like and output timing generating circuit 6 form a control means.

Image input circuit 103-1, receiving the left-eye image signal and the right-eye image signal, combines one frame of left-eye image signal and one frame of right-eye image signal, line by line in an alternating manner to output one frame of output image signals to cinema display circuit 104.

Clock frequency measuring circuit 1 measures the frequency of the clock signal in the input signal, either the left-eye image signal or the right-eye image signal, (the left-eye image signal in the present exemplary embodiment).

Horizontal total clock number measuring circuit 2 measures the first total number, specifically, the total number of clock signals during the horizontal period of the input signal, based on the clock signals in the input signal and the horizontal synchronization signal.

Horizontal total clock number measuring circuit 3, based on the signal indicating the valid image period with valid image data existing therein and the clock signal, in the input signal, measures the second total number, specifically, the total number of the clock signals in the valid image period.

Operation circuit 4 determines, based on the frequency of clock signals measured by clock signal measuring circuit 1, the first total number measured by horizontal total clock number measuring circuit 2, the second total number measured by horizontal image clock number measuring circuit 3 and the permissible maximum transmission rate for cinema display circuit 104, determines the multiply ratio for the clock signal and the third total number as the total number of the clock signals in the horizontal period of the output image signal.

Multiplied clock generating circuit 5 generates multiplied clocks by multiplying the clock signal in the input signal by the multiply ratio determined by operator circuit 4, and reads out one line of the left-eye image signal and one line of the right-eye image signal in synchronization with the multiplied clocks, from line memories 103d and 103e.

Output timing generating circuit 6, based on the third total number determined by operation circuit 4 and the timing signal in the input signal, generates timing signals for output image signals.

Multiplexer (output means) 103g Outputs one line of the left-eye image signal and one line of the right-eye image signal read out by multiplied clock generating circuit 5, alternately in accordance with the timing signals for output image signals generated by output timing signal generating circuit 6, to produce an output image signal and output the signal to cinema display circuit 104.

Next, the operation will be described.

In FIG. 5, clock frequency measuring circuit 1 measures the frequency of the clock of the input image signals, horizontal total clock number measuring circuit 2 measures the total number of horizontal clocks based on the horizontal synchronization signals to be the timing signal, and horizontal image clock number measuring circuit 3 measures the number of horizontal image clocks based on the signals indicating valid image data.

The measurements from these measuring circuits are input to operation circuit 4. Operation circuit 4 determines whether or not the multiply ratio of the input clock frequency needs to be changed, and determines whether the multiply ratio can be changed, from the measurement of the horizontal total clock number (the first total number) and the horizontal image clock number (the second total number), to thereby set up a multiply ratio of multiplied clock generating circuit 5. Operation circuit 4 also calculates the total number of output horizontal clocks (the third total number) so that the output line frequency becomes double the input line frequency when the multiply ratio is lowered.

Based on the calculated total number of output horizontal clocks, output timing generating circuit 6 generates timing signals to cinema display circuit 104.

On the other hand, the image signals for the left eye and the right eye are accumulated in line memories 103d and 103e, which are read out, line by line, one line for the left eye and one line for the right eye, alternately at the rate of the output clock from multiplied clock generating circuit 5, switched by multiplexer MUX 103g and output.

Next, operation circuit 4 will be described in detail.

The output horizontal total clock number calculated by operation circuit 4 is determined by the following formula.

Output Horizontal Total Clock Number=Input Horizontal Total Clock Measurement−(Input Horizontal Total Clock Measurement×(2−Multiply Ratio)÷2)

Here, the calculation result has to be an integer which does not include a decimal.

Further, the output horizontal total clock number has to be equal to or greater than the sum of the horizontal image clock number and the value of the minimum horizontal blanking required by cinema display circuit 104.

Figure 6:
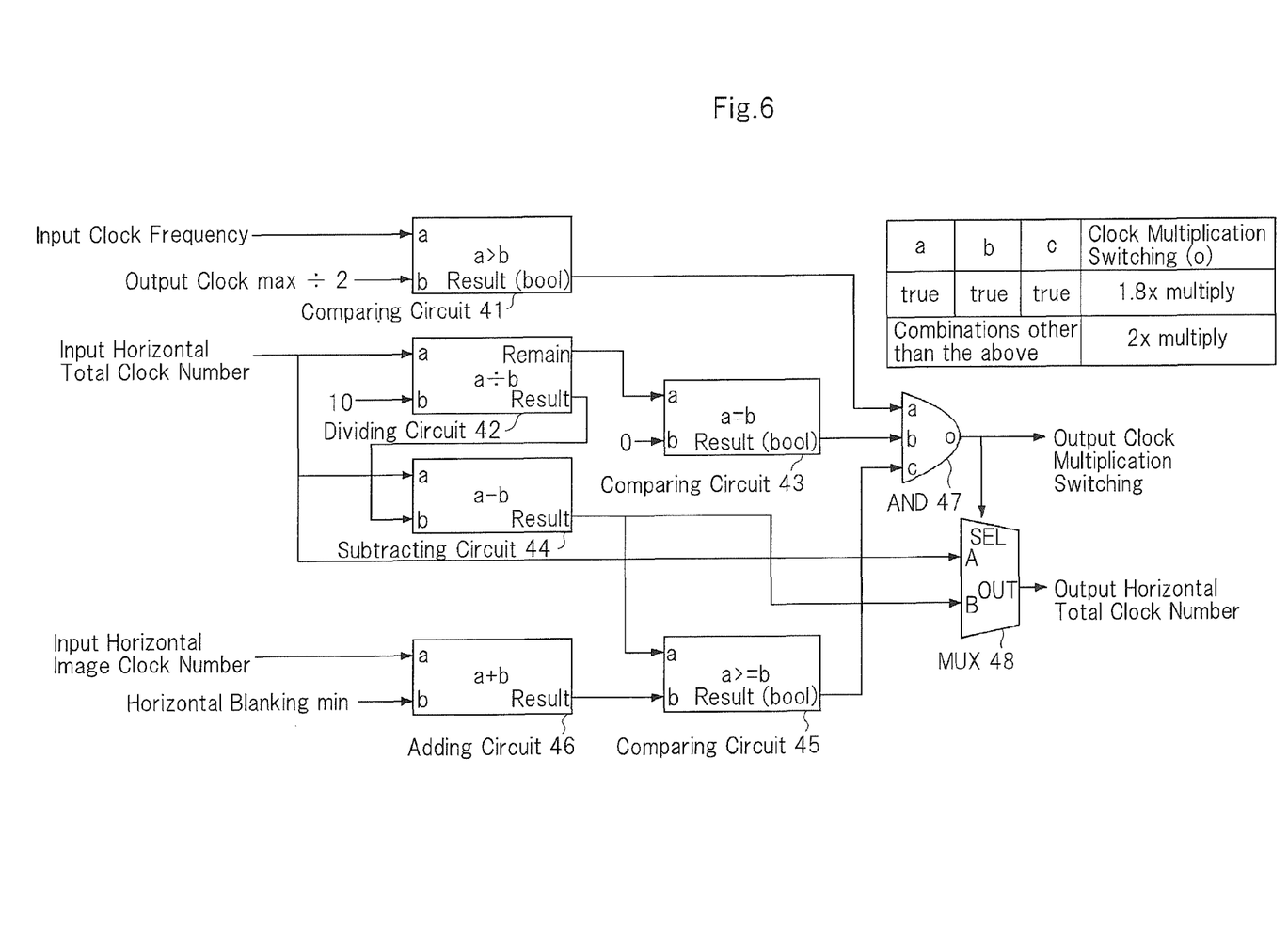
FIG. 6 A diagram showing one example of operation circuit 4.

FIG. 6 shows a detailed block diagram of operation circuit 4 for calculating the above requirements.

For description simplicity, the configuration in FIG. 6 is constructed such that the multiply ratio is set at 1.8 for an input that exceeds the maximum rate of transmission to cinema display circuit 104 when the clock is multiplied by 2.

In FIG. 6, comparing circuit 41 checks whether the measurement of the clock frequency of the input signal is higher than half of the maximum rate of transmission to cinema display circuit 104.

Instead of multiplying the value by 0.1=(2−1.8)÷2), dividing circuit 42 divides the measurement of the horizontal total clock number by 10. Comparing circuit 43 checks whether or not the remainder is equal to 0, to thereby detect whether the output total clock number is an integer.

On the other hand, subtracting circuit 44 subtracts the quotient that was obtained by dividing the horizontal total clock number by 10, from the measurement of the horizontal total clock number to thereby determine the output horizontal total clock number. Comparing circuit 45 checks whether the result of calculation from subtracting circuit 44 is equal to or greater than the value calculated by adding circuit 46, i.e., the sum of the measurement of the horizontal image clock number and the minimum value of horizontal blanking of cinema display circuit 104.

Herein, if an image signal that exceeds the half of the maximum transmission rate for cinema display circuit 104 is input, and if the remainder, when the horizontal total clock number is divided by 10, is zero and if the output horizontal total clock is equal to or greater than the sum of the horizontal image clock number and the value of horizontal minimum blanking, AND circuit 47 outputs true ("H") to switch the multiply ratio to 1.8 and the output from multiplexer 48 is also switched to the output for 1.8× multiplication.

When any of the above conditions are not satisfied, 2× multiplication is selected and the horizontal clock number is output at the same value as that of the input.

Next, another exemplary embodiment of the present invention will be described.

The second exemplary embodiment of the present invention is characterized such that the multiplying value of multiplied clock generating circuit 5 is increased while multiple operation circuits 4 are provided to deal with an increased number of input signals though the basic configuration is the same as that shown in FIG. 5.

Figure 7:
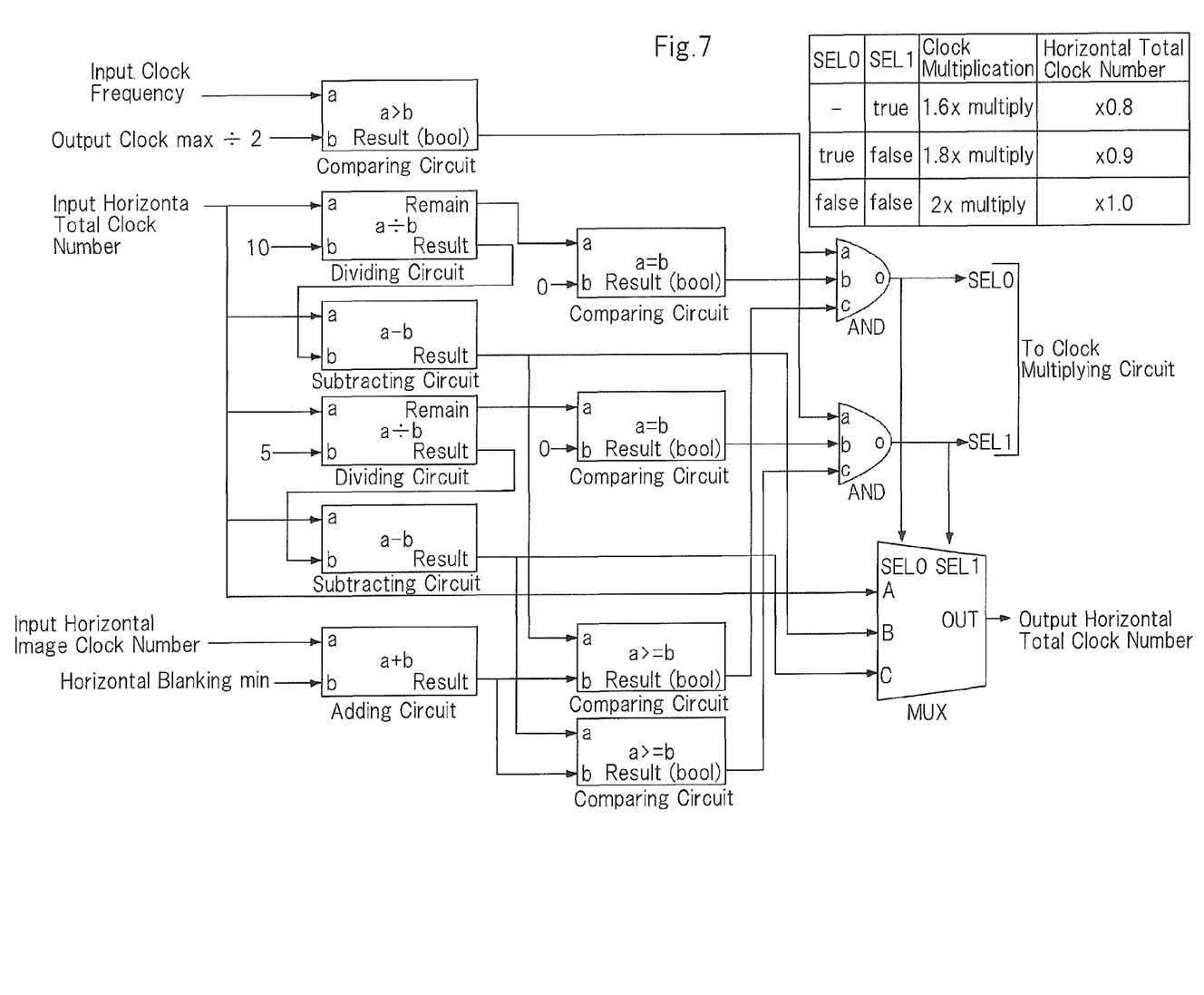
FIG. 7 A diagram showing another exemplary embodiment of the present invention.

FIG. 7 shows the second exemplary embodiment.

In the configuration shown in FIG. 7, 1.6× multiplication is added to multiplied clock generating circuit 5 in comparison with the exemplary embodiment shown in FIGS. 5 and 6 so that the output clock can be selected from 1.6× multiplication, 1.8× multiplication and 2× multiplication. If the result of operation for 1.6× multiplication is true, 1.6× multiplication is selected; if the result of operation for 1.6× multiplication is false and if the result of operation for 1.8× multiplication is true, 1.8× multiplication is selected; and if any result of the operations are false, 2× multiplication is selected. As a result, compared to the case including only two multiplication ratios, it is possible to deal with higher input clock frequencies.

Since operation circuit 4 becomes complicated with increases in the number of multiplication levels, if an operation device such as a CPU or the like is available, operation of the CPU or the like may be used instead of circuits as the functional part included in the operation circuit.

As described heretofore, each of the above exemplary embodiments is characterized by making it possible to support a high-resolution 3D image in displaying a 3D image in a cinema projector which does not use any additional frame memory, by adding circuits that measure the clock frequency of the input to lower the clock multiply ratio and reduce the horizontal total clock number when the rate of transmission to cinema display circuit 104 exceeds the upper limit of frequency.

Next, the effect of the above exemplary embodiments will be described.

According to each of the above exemplary embodiments, if double the frequency of the input clock exceeds the maximum rate of transmission to cinema display circuit 104, it is possible to deal with a higher input clock frequency compared to the prior art by lowering the clock multiplying ratio from 2× and reducing the output horizontal total clock number accordingly. As a result, it is possible to support a 3D image input signal that exceeds the maximum transmission rate of the cinema display circuit without adding any frame memory.

Since the present invention has been described with reference to each exemplary embodiment, the present invention should not be limited to the above exemplary embodiments. Various changes that can be understood by those skilled in the art can be made in the structure and details of the invention within the scope of the invention.

DESCRIPTION OF REFERENCE NUMERAL

103*a*, 103*b* image input circuit
1 clock frequency measuring circuit
2 horizontal total clock measuring circuit
3 horizontal image clock number measuring circuit
4 operation circuit
5 multiplied clock generating circuit
6 output timing generating circuit

What is claimed is:

1. A 3D image signal processing apparatus which,
receives a plurality of image signals for the left eye and the right eye, each image signal including a clock signal and each image signal representing a plurality of lines,
outputs one frame of output image signals formed by combining one line of the left-eye image signal and one line of the right-eye image signal, alternately, to a display circuit, and
causes the display circuit to display images of every frame, the apparatus comprising:
a first line storing unit storing every line of the left-eye image;
a second line storing unit storing every line of the right-eye image;
a measuring unit measuring the frequency of the clock signal in the input left-eye image signal or right-eye image signal; and,
a control unit which, when the frequency of the clock signal measured by the measuring unit is higher than a permissible maximum transmission rate for the display circuit,
sets the frequency of the clock signal for output image signals, which are to be used for reading out one line of the left-eye image signal and one line of the right-eye image signal from the first line storing unit and the second line storing unit respectively, to be smaller than double the frequency of the clock signal in the input signal, and
reduces the number of clock signals for output image signals that are included in the horizontal period in the output image signal, to less than the number of clock signals that are included in the horizontal period of the input signal.

* * * * *